United States Patent
Mansfield et al.

(10) Patent No.: US 8,480,105 B2
(45) Date of Patent: Jul. 9, 2013

(54) VEHICLE AXLE WITH RECEIVER FOR TOWING

(75) Inventors: Richard M. Mansfield, North Augusta, SC (US); Matthew J. Zaremba, Evans, GA (US)

(73) Assignee: Club Car, LLC, Evans, GA (US)

( * ) Notice: Subject to any disclaimer, the term of this patent is extended or adjusted under 35 U.S.C. 154(b) by 35 days.

(21) Appl. No.: 13/185,275

(22) Filed: Jul. 18, 2011

(65) Prior Publication Data
US 2013/0020145 A1    Jan. 24, 2013

(51) Int. Cl.
*B60D 1/14* (2006.01)
*B60G 9/02* (2006.01)

(52) U.S. Cl.
USPC ........... 280/124.116; 280/137.501; 280/495; 280/503

(58) Field of Classification Search
USPC .............. 280/124.116, 124.153, 124.156, 280/495, 503, 137.5, 137.501; 301/124.1, 301/128, 137
See application file for complete search history.

(56) References Cited

U.S. PATENT DOCUMENTS

| 1,495,306 | A |   | 5/1924  | Holmes   |         |
|-----------|---|---|---------|----------|---------|
| 1,521,052 | A |   | 12/1924 | Silva    |         |
| 2,743,118 | A |   | 4/1956  | Dotson   |         |
| 3,129,019 | A |   | 4/1964  | Bartone  |         |
| 3,220,749 | A |   | 11/1965 | Mathisen |         |
| 3,265,406 | A |   | 8/1966  | Russell  |         |
| 3,749,421 | A | * | 7/1973  | Rudd     | 172/439 |
| 3,814,464 | A | * | 6/1974  | Wardill et al. | 280/476.1 |
| 3,833,243 | A |   | 9/1974  | Hanson   |         |
| 3,865,404 | A | * | 2/1975  | Schwartz | 280/416.1 |
| 4,398,617 | A | * | 8/1983  | Crabb et al. | 180/235 |
| 4,420,169 | A |   | 12/1983 | Taylor   |         |
| 5,102,156 | A | * | 4/1992  | Fink et al. | 280/495 |
| 5,149,122 | A |   | 9/1992  | Helber   |         |
| 5,167,423 | A |   | 12/1992 | Hall, Jr. |        |
| 5,458,359 | A | * | 10/1995 | Brandt   | 280/124.111 |
| 5,524,921 | A | * | 6/1996  | Ellingsen | 280/124.116 |
| 5,707,072 | A |   | 1/1998  | Hopper   |         |
| 5,746,275 | A |   | 5/1998  | Cross et al. |     |
| 6,032,967 | A | * | 3/2000  | Ogoniek  | 280/124.175 |
| 6,305,487 | B1| * | 10/2001 | Montague | 180/350 |
| 6,729,637 | B2| * | 5/2004  | Wolters et al. | 280/491.3 |
| 7,350,794 | B2| * | 4/2008  | Griffith, Jr. | 280/124.128 |
| 7,469,913 | B2| * | 12/2008 | Leden et al. | 280/124.107 |
| 2009/0127812 | A1 | * | 5/2009 | Copsey et al. | 280/124.128 |
| 2010/0213688 | A1 | * | 8/2010 | Kuzara | 280/495 |
| 2011/0109063 | A1 |   | 5/2011 | Fudala et al. |     |

FOREIGN PATENT DOCUMENTS

WO        92/02381        2/1992

OTHER PUBLICATIONS

International Search Report and Written Opinion for Application No. PCT/US2012/043444 dated Jan. 14, 2013 (10 pages).

* cited by examiner

*Primary Examiner* — Joseph Rocca
*Assistant Examiner* — Darlene P Condra
(74) *Attorney, Agent, or Firm* — Michael Best & Friedrich LLP

(57) ABSTRACT

A receiver for towing is coupled to a vehicle that includes a frame, a rear axle, and a suspension system that couples the rear axle to the frame. The receiver including a body that defines a cavity sized to receive a towing attachment, and a suspension mount rigidly coupled to the body. At least a portion of the suspension system mounted to and supported by the suspension mount.

18 Claims, 4 Drawing Sheets

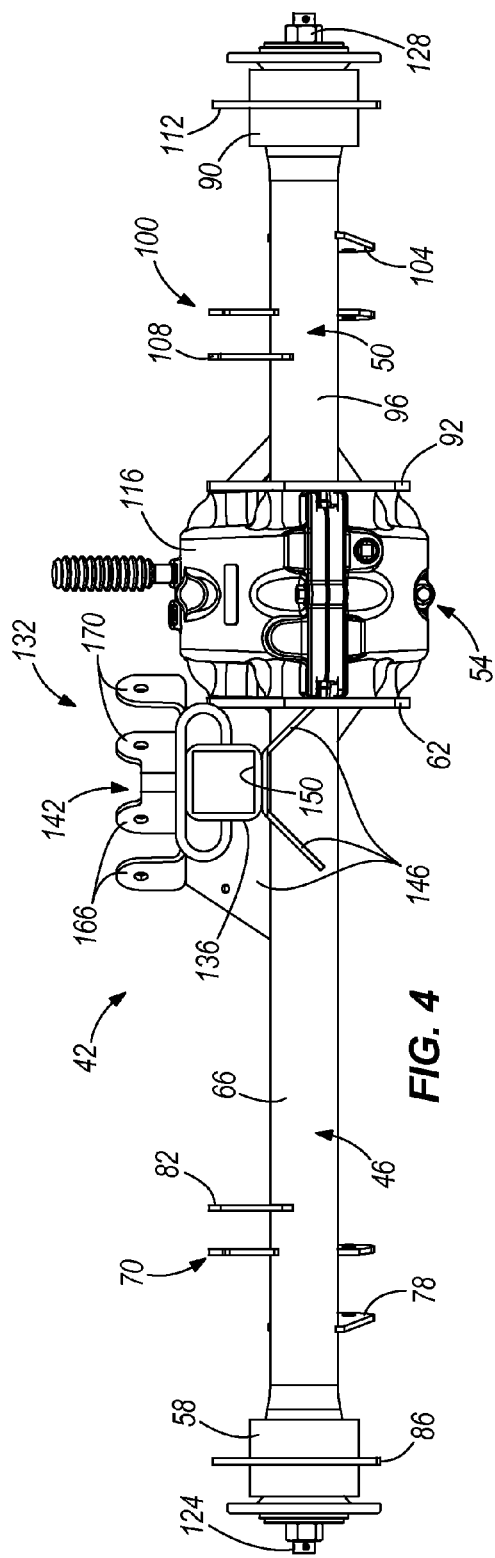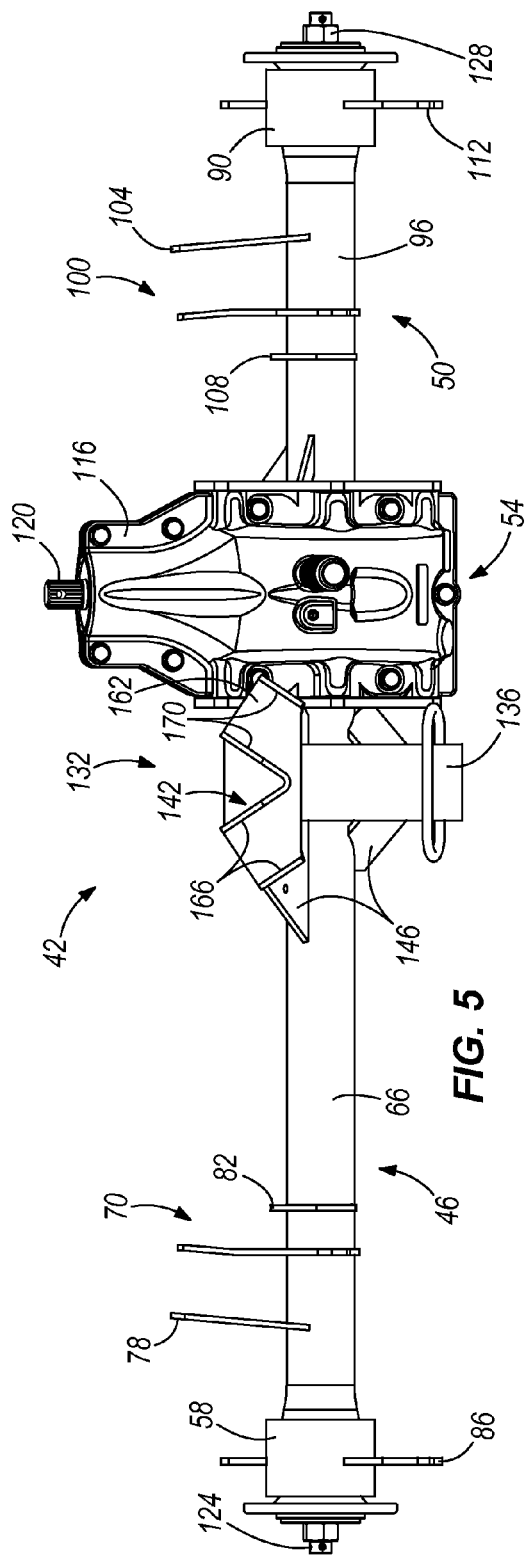

VEHICLE AXLE WITH RECEIVER FOR TOWING

BACKGROUND

The present invention relates to towing arrangements for vehicles. More specifically, the invention relates to towing receivers and hitches that are coupled to a rear axle of a vehicle.

SUMMARY

In one embodiment, the invention provides a vehicle that includes a frame, a prime mover coupled to the frame for driving the vehicle, a rear axle, and a pair of rear wheels mounted to the rear axle for rotation under the influence of the prime mover. A suspension system is coupled between the rear axle and the frame and defines a suspension gap therebetween when the suspension system is in an at-rest condition. The suspension system includes a suspension element that permits relative movement between the rear axle and the frame to increase and decrease the suspension gap in response to the vehicle moving over rough terrain. The vehicle further includes a towing receiver for receiving attachments to facilitate towing with the vehicle. A portion of the suspension element is mounted to the towing receiver and bears against the towing receiver.

In another embodiment the invention provides a receiver for towing that is coupled to a vehicle that includes a frame, a rear axle, and a suspension system that couples the rear axle to the frame. The receiver includes a body that defines a cavity sized to receive a towing attachment, and a suspension mount that is rigidly coupled to the body. At least a portion of the suspension system is mounted to and supported by the suspension mount.

In another embodiment the invention provides a rear axle assembly for a vehicle. The rear axle assembly including an axle body and a receiver that is rigidly coupled to the axle body. The receiver includes a receiver body that defines a cavity sized to receive a towing attachment and a suspension mount that is rigidly coupled to the receiver body and supports a suspension element.

Other aspects of the invention will become apparent by consideration of the detailed description and accompanying drawings.

BRIEF DESCRIPTION OF THE DRAWINGS

FIG. 4 is a rear view of the rear axle and the receiver of FIG. 1.

FIG. 5 is a top view of the rear axle and the receiver of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
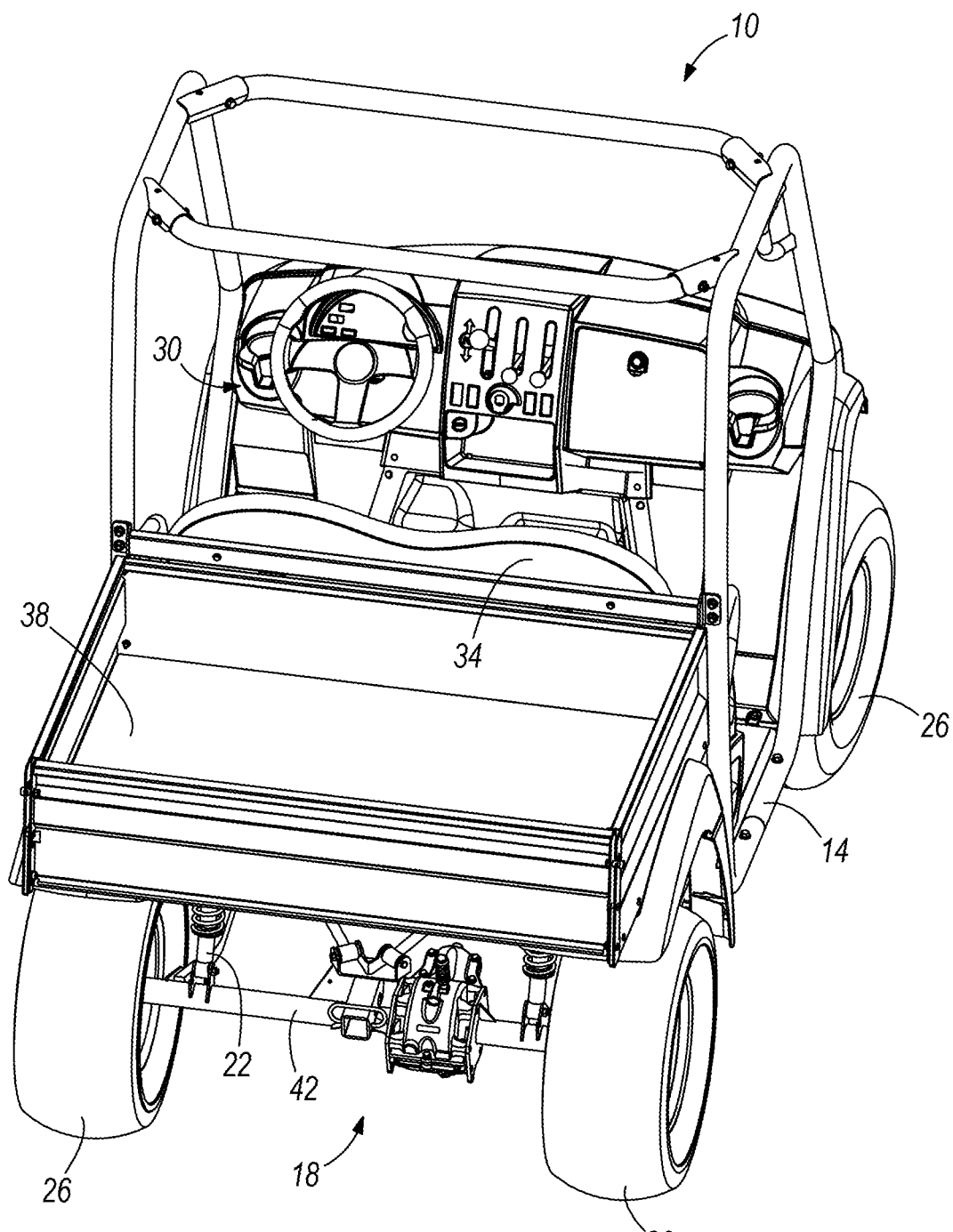
FIG. 1 is a perspective view of a vehicle including a rear axle and a receiver for towing.

FIG. 1 shows a vehicle 10 in the form of an off road utility vehicle. The vehicle 10 includes a frame 14, a prime mover (shown within the front of the vehicle 10), a power train 18, a suspension system 22, four wheels 26 (three shown), a driving console 30 in communication with the prime mover and the power train 18, a seat 34, and a storage area 38. In other constructions, the vehicle 10 may be arranged differently or may be another type of vehicle. For example, an all terrain vehicle (ATV), a golf car, or another vehicle, as desired. Generally, the prime mover provides power to the vehicle 10. The power train 18 transfers power from the prime mover to the wheels 26 to move the vehicle 10 over ground. The driving console 30 allows a user to steer the vehicle 10, control acceleration and braking, and operate the many systems of the vehicle 10 (e.g., lights, horn, etc.). The general arrangement of the common components of the vehicle 10 are not limiting to the scope of the invention.

The power train 18 includes a rear axle 42 as shown in FIGS. 2-5. With specific reference to FIG. 2, the rear axle 42 includes a left axle casing 46 positioned on a left side of the vehicle 10, a right axle casing 50 positioned generally on a right side of the vehicle 10, and a differential 54 positioned between the left axle casing 46 and the right axle casing 50. The left axle casing 46 defines a bearing housing 58 at a left end, a flange 62 at a right end that is arranged to rigidly bolt to the differential 54, and a hollow cylinder 66 formed between the bearing housing 58 and the flange 62. A left suspension mount 70 is welded to the left axle casing 46 between the bearing housing 58 and the flange 62. The left suspension mount 70 includes a left lower swing arm bracket 78 and a left vertical shock bracket 82. The interaction of the left suspension mount 70 with the suspension system 22 will be discussed below. Further, a left brake mount 86 is welded to the bearing housing 58. The left brake mount 86 supports a brake assembly (not shown) as is well known in the art.

Similarly, the right axle casing 50 defines a bearing housing 90 at a right end, a flange 92 at a left end that is arranged to rigidly bolt to the differential 54, and a hollow cylinder 96 formed between the bearing housing 90 and the flange 92. A right suspension mount 100 is welded to the right axle casing 50 between the bearing housing 90 and the flange 92. The right suspension mount 100 includes a right lower swing arm bracket 104 and a right vertical shock bracket 108. The interaction of the right suspension mount 100 with the suspension system 22 will be discussed below. Further, a right brake mount 112 is welded to the bearing housing 90. The right brake mount 112 supports a brake assembly (not shown) as is well known in the art. The specific arrangement of the left axle casing 46 and the right axle casing 50 may be changed. For example, the suspension mounts 70, 100 may be altered or eliminated. Further, the brake mounts 86, 112 may be altered or eliminated.

The differential 54 is positioned between the left axle casing 46 and the right axle casing 50. The differential 54 includes a differential casing 116, a drive shaft 120 that is coupled to the rest of the power train 18 and the prime mover to provide power to the rear axle 42, a left shaft 124 coupled to the drive shaft 120, passing through the left axle casing 46, and mounting to a rear left wheel 26, and a right shaft 128 (see FIGS. 4 and 5) coupled to the drive shaft 120, passing through the right axle casing 50, and mounting to the rear right wheel 26. The flange 62 of the left axle casing 46 is bolted to the differential casing 116 and the flange 92 of the right axle casing 50 is bolted to the differential casing 116 to form a rigid shell or assembly of the rear axle 42. The drive shaft 120, the left shaft 124, the right shaft 128, and other moving components define a moving or dynamic assembly of the rear axle 42 that operates within the rigid assembly. The construction and operation of differentials is well known in the art and will not be discussed in detail herein. Any suitable differential may be used. In the illustrated embodiment, the left axle casing 46 is longer than the right axle casing 50 such that the differential 54 is offset from the center of the vehicle 10 in a cross-vehicle or side-to-side direction.

Figure 2:
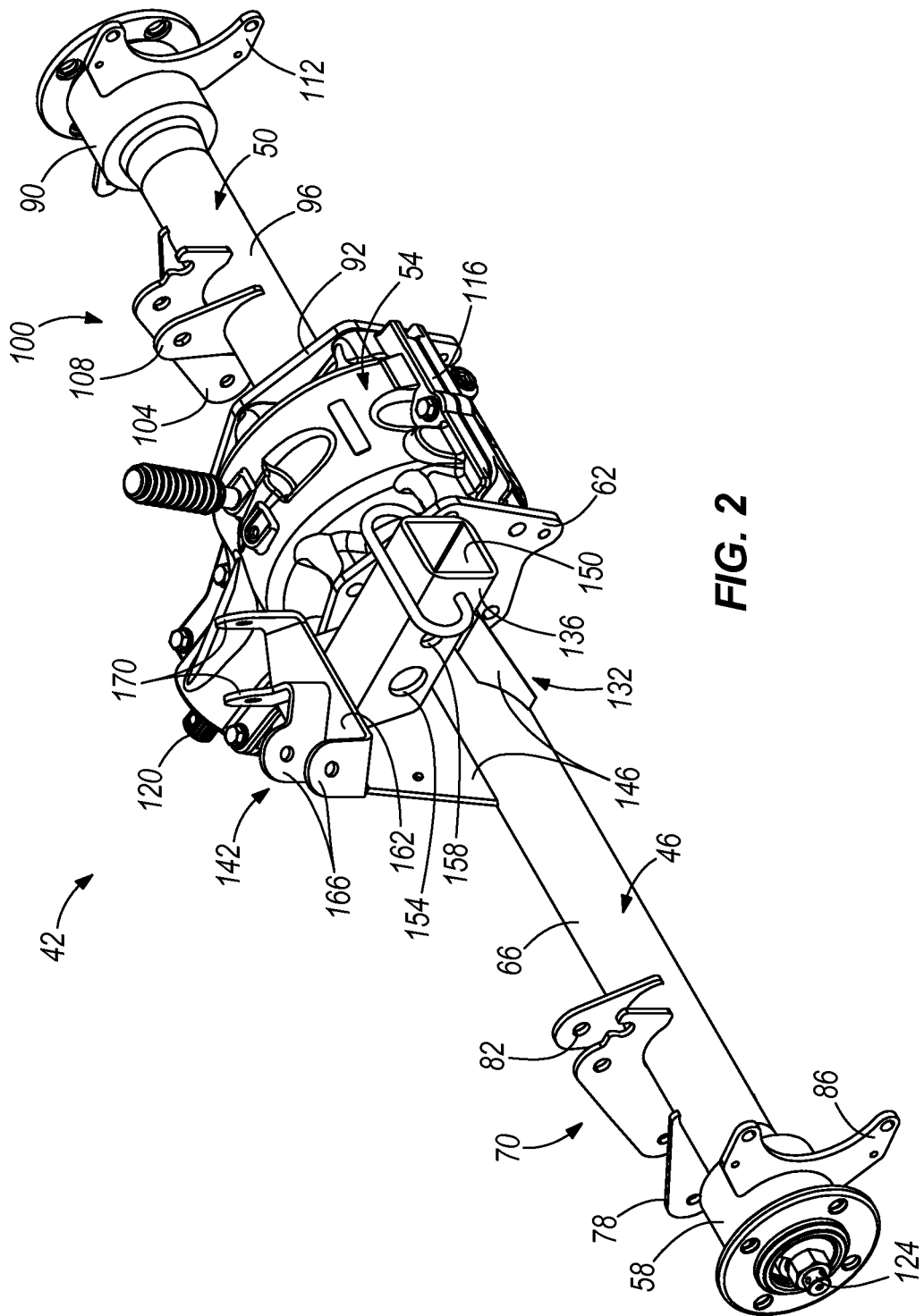
FIG. 2 is a perspective view of the rear axle and the receiver of FIG. 1.

With continued reference to FIG. 2, the invention provides a towing receiver 132 coupled to the rigid assembly of the rear axle 42. The towing receiver 132 includes a body in the form of a substantially square tube 136, a receiver suspension mount 142, and a support web 146 that adds rigidity and strength to the structure of the towing receiver 132. The square tube 136 defines an interior profile or cavity 150 that is sized and shaped to receive common towing components (e.g., draw bars, ball mounts or hitches, bike racks, platforms, etc.). The interior profile 150 most often has a one-and-one-quarter inch (1¼") or a two inch (2") dimension.

A mounting aperture 154 is formed through the square tube 136 in a substantially horizontal direction and parallel with the rear axle 42. The mounting aperture 154 is positioned and sized such that an installer may insert and tighten a mounting bolt for assembling the rear axle 42 therethrough. In the illustrated embodiment, the left axle casing 46 is fastened or bolted to the differential 54. The mounting aperture 154 provides an access to the fasteners while the towing receiver 132 is installed or in position (e.g., welded) to the rigid assembly of the rear axle 42. This allows an installer or service technician to bolt and unbolt the left axle casing 46 to the differential 54. In other embodiments, more mounting apertures 154 may exist.

A pin aperture 158 is also formed through the square tube 136 substantially horizontally and arranged such that when the towing component is positioned within the square tube 136, a matching aperture on the towing component may be aligned with the pin aperture 158, and a pin (not shown) driven therethrough to maintain the towing component within the towing receiver 132.

The receiver suspension mount 142 is welded to the square tube 136 and includes a flat bottom portion 162, a left receiver suspension bracket 166 or mount, and a right receiver suspension bracket 170 or mount. The left receiver suspension bracket 166 is arranged at an oblique angle of fifty-six degrees relative to a front-to-back direction and includes two tabs projecting upward from the flat bottom portion 162. The right receiver suspension bracket 170 is arranged at an oblique angle of fifty-six degrees relative to a front-to-back direction toward an opposite side of the vehicle 10 and includes two tabs projecting upward from the flat bottom portion 162. The left receiver suspension bracket 166 and the right receiver suspension bracket 170 are sized to receive components of the suspension system 22, as will be discussed further below. Each of the illustrated left receiver suspension bracket 166 and the right receiver suspension bracket 170 are formed of tabs that project from the flat bottom portion 162. Apertures are formed in the tabs and sized to receive fasteners for coupling suspension elements or components thereto. In other embodiments, the angle of the left receiver suspension bracket 166 and the right receiver suspension bracket 170 may be different, as desired. For example, any angle between zero and one-hundred-eighty degrees has been contemplated.

In the illustrated embodiment, the towing receiver 132 is welded to the left axle casing 46 and positioned substantially in the center of the vehicle 10 in the side-to-side direction. The square tube 136 and the support web 146 are welded to the left axle casing 46. In other embodiments, the right axle casing 50 may be longer than the left axle casing 46 such that the towing receiver 132 is welded to the right axle casing 50 and centered on the vehicle 10 in the side-to-side direction. In yet other embodiments, the towing receiver 132 may be positioned differently (e.g., not in the center of the vehicle 10).

Figure 3:
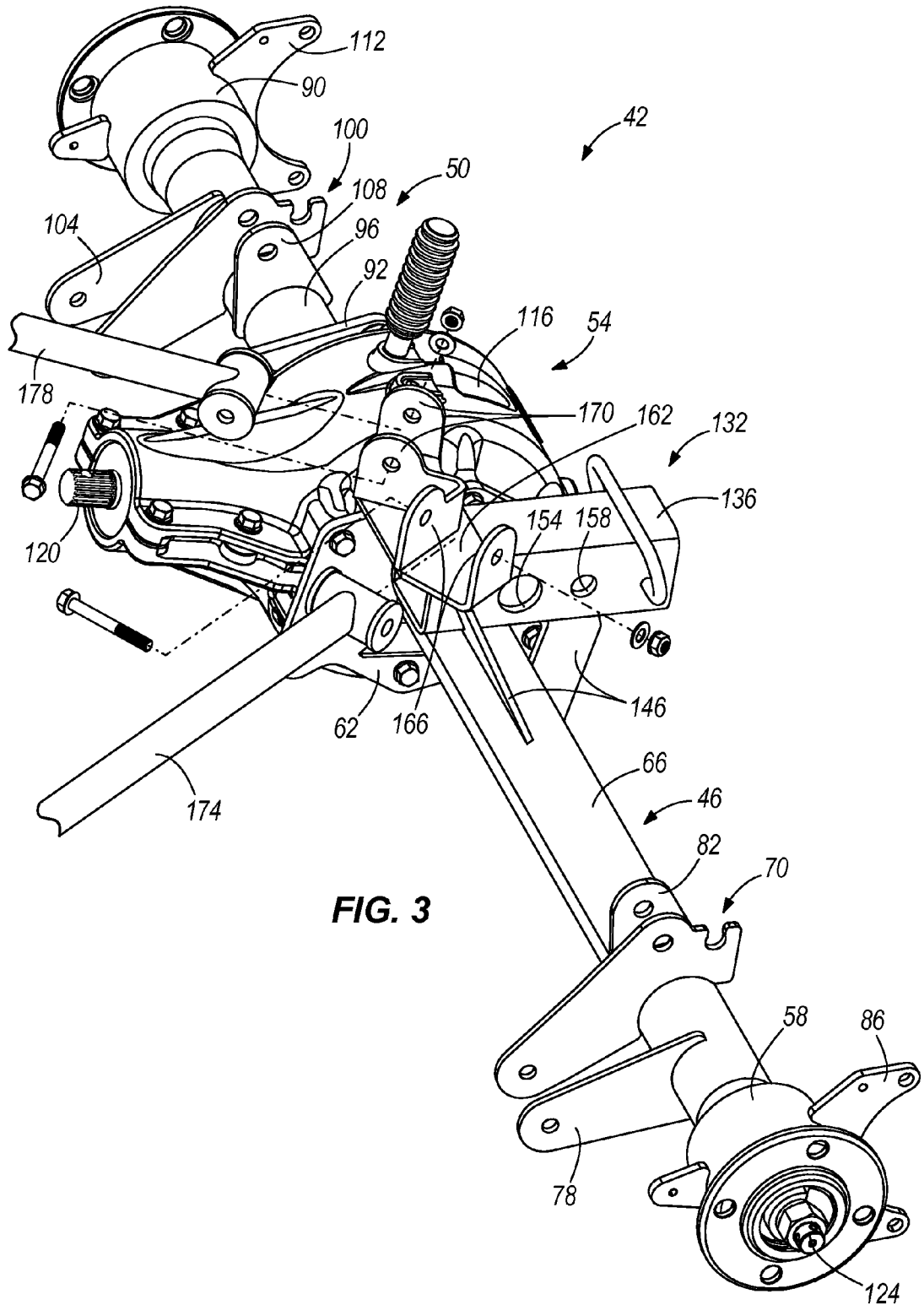
FIG. 3 is another perspective view of the rear axle and the receiver of FIG. 1.

With reference to FIGS. 1 and 3, the suspension system 22 includes a left lower swing arm rotatably coupled to the left lower swing arm bracket 78, a right lower swing arm (not shown) rotatably coupled to the right lower swing arm bracket 104, a left vertical shock (not shown) coupled to the left vertical shock bracket 82, a right vertical shock (not shown) coupled to the right vertical shock bracket 108, a left lateral swing arm 174 rotatably coupled to the left receiver suspension bracket 166, and a right lateral swing arm 178 rotatably coupled to the right receiver suspension bracket 170. The left lateral swing arm 174 and the right lateral swing arm 178 are supported by the left receiver suspension bracket 166 and the right receiver suspension bracket 170, respectively, such that the left lateral swing arm 174 bears against the left receiver suspension bracket 166 and the right lateral swing arm 178 bears against the right receiver suspension bracket 170. The components of the suspension system 22 cooperate to support the frame 14 of the vehicle 10 above the rear axle 42 as is known in the art.

The specific arrangement of the suspension system 22 may be altered, as desired. In turn, the receiver suspension mount 142 would be altered to accommodate and support the suspension system 22. For example, the invention could be applied to a three-link suspension system, with the receiver suspension mount 142 connected to a single suspension link, member, or shock. Another arrangement includes a panhard bar or Watt's linkage attached to the receiver suspension mount 142 using a Hotchkiss-style leaf-spring suspension system.

The suspension system 22 couples the rear axle 42 to the frame 14 and defines a suspension gap between the rear axle 42 and the frame 14 when the suspension system 22 is in an at-rest condition. The suspension system 22 includes a suspension element (e.g., the left lateral swing arm 174) that permits relative movement between the rear axle 42 and the frame 14 to increase and decrease the suspension gap in response to the vehicle 10 moving over rough terrain or ground.

The invention provides, among other things, a towing feature that minimizes the mass and support structure of the suspension. The invention provides an integration of a towing interface in the form of the tower receiver into the structure that positions and supports the rigid assembly of the rear axle 42 assembly relative to the vehicle frame 14. Strong structures are desirable for both suspension-mounting bracketry and towing. By welding the receiver suspension mount 142 to the receiver tube 136, the receiver's strength serves double-duty. The invention provides a standard towing interface such that it may be used with industry standard towing components, but also provides a towing interface with less mass and reduced assembly complexity.

Various features and advantages of the invention are set forth in the following claims.

What is claimed is:

1. A vehicle comprising:
a frame;
a prime mover coupled to the frame for driving the vehicle;
a rear axle;
a pair of rear wheels mounted to the rear axle for rotation under the influence of the prime mover;

a suspension system coupling the rear axle to the frame and defining a suspension gap between the rear axle and the frame when the suspension system is in an at-rest condition, the suspension system including a swing arm permitting relative movement between the rear axle and the frame to increase and decrease the suspension gap in response to the vehicle moving over rough terrain;

a towing receiver for receiving attachments to facilitate towing with the vehicle, an end of the swing arm being mounted to the towing receiver such that the swing arm is positioned entirely above and bears against the towing receiver when the suspension system is in the at-rest condition.

2. The vehicle of claim 1, wherein the towing receiver is rigidly coupled to the rear axle and is positioned in a center of the rear axle in a cross-vehicle direction.

3. The vehicle of claim 1, wherein the towing receiver includes a body formed as a square tube and a tab projecting from the body, the swing arm mounted to the tab.

4. The vehicle of claim 1, wherein the rear axle includes a rigid assembly and moving parts within the rigid assembly, the towing receiver welded to the rigid assembly.

5. The vehicle of claim 1, wherein the swing arm is a first swing arm and the suspension system includes a second swing arm,
wherein the towing receiver includes a first suspension mount and a second suspension mount, and
wherein the first swing arm is mounted to and supported by the first suspension mount and the second swing arm is mounted to and supported by the second suspension mount.

6. The vehicle of claim 1, wherein the rear axle includes a rigid assembly and moving parts within the rigid assembly,
wherein the towing receiver includes a square tube for receiving the attachments, a receiver suspension mount for supporting the swing arm, and a support web for adding strength to the towing receiver, and
wherein the square tube is welded to the rigid assembly of the rear axle, the receiver suspension mount is welded to the square tube, and the support web is welded between the square tube and the rigid assembly of the rear axle.

7. The vehicle of claim 6, wherein the towing receiver defines an aperture for providing access to a fastener on the rigid assembly of the rear axle.

8. A receiver for towing coupled to a vehicle including a frame, a rear axle, and a suspension system coupling the rear axle to the frame, the receiver comprising:
a body defining a cavity sized to receive a towing attachment, the body including a first surface configured to face toward the rear axle and a second surface configured to face away from the rear axle; and
a suspension mount rigidly coupled to the second surface of the body, the suspension mount including two tabs projecting upward from the second surface of the body, the two tabs configured to receive a swing arm of the suspension system to support the swing arm on the rear axle through the body.

9. The receiver of claim 8, wherein the body is rigidly mounted to the rear axle.

10. The receiver of claim 8, wherein the body is welded to the rear axle.

11. The receiver of claim 8, wherein the two tabs are a first set of two tabs and the suspension mount includes a second set of two tabs, the second set of two tabs configured to receive a second swing arm of the suspension system to support the second swing arm on the rear axle through the body.

12. The receiver of claim 11, wherein the body includes a tube defining the cavity, the tube configured to be arranged transverse to the rear axle,
wherein the first set of two tabs is arranged at an oblique angle relative to the tube, and
wherein the second set of two tabs is arranged at an oblique angle relative to the tube.

13. The receiver of claim 8, wherein the body includes a square tube that defines the cavity, the receiver further comprising a support web for adding strength to the receiver.

14. A rear axle assembly for a vehicle, the rear axle assembly comprising:
an axle body; and
a receiver rigidly coupled to the axle body, the receiver including
a receiver body defining a cavity sized to receive a towing attachment, the receiver body including a first surface that faces toward the axle body and a second surface that faces away from the axle body, and
a suspension mount rigidly coupled to the second surface of the receiver body, the suspension mount including two tabs projecting upward from the second surface of the body, the tabs configured to receive a swing arm to support the swing arm on the axle body through the receiver body.

15. The rear axle assembly of claim 14, wherein the receiver is welded to the axle body.

16. The rear axle assembly of claim 14, wherein the axle body includes a rigid assembly and moving parts within the rigid assembly,
wherein the receiver body includes a square tube for receiving the towing attachment, and
wherein the square tube is welded to the rigid assembly of the axle body, the suspension mount is welded to the square tube, and a support web is welded between the square tube and the rigid assembly of the axle body.

17. The rear axle assembly of claim 14, wherein the receiver body defines an aperture for accessing a fastener of the axle body through the receiver body.

18. The rear axle assembly of claim 14, wherein the axle body includes a first casing, a second casing, and a differential with a body rigidly fastened between the first casing and the second casing, the first casing, the second casing, and the differential body defining a rigid assembly of the axle body,
wherein the axle body further includes a drive shaft positioned at least partially within the differential, a first shaft positioned at least partially in the first casing, a second shaft positioned at least partially in the second casing,
wherein the receiver body is welded to the rigid assembly of the axle body, and
wherein the receiver body defines an aperture for accessing a fastener of the rigid assembly through the receiver body.

* * * * *